United States Patent [19]
Iler

[11] Patent Number: 5,668,737
[45] Date of Patent: Sep. 16, 1997

[54] HIGH-SPEED DATA PROCESSOR AND CODING METHOD

[75] Inventor: John Iler, Burlington, Mass.

[73] Assignee: Pixel Magic, Inc., Andover, Mass.

[21] Appl. No.: 408,215

[22] Filed: Mar. 22, 1995

[51] Int. Cl.[6] .................................................. H04N 5/76
[52] U.S. Cl. .............................. 395/800.01; 341/65
[58] Field of Search ................ 364/715.02, 514 R; 348/469, 384; 395/200, 800; 341/65

[56] References Cited

U.S. PATENT DOCUMENTS 5,461,722 10/1995 Goto .................................... 395/800
5,534,931 7/1996 Kondo .................................. 348/420
5,550,540 8/1996 Furlan et al. ............................ 341/51

*Primary Examiner*—Benedict V. Safourek
*Assistant Examiner*—Ajit Patel
*Attorney, Agent, or Firm*—Testa, Hurwitz & Thiebault, LLP

[57] ABSTRACT

A high-speed data processor and data compression method includes an input module for receiving an input data stream from an input port. An encoder is coupled to the input module and performs arithmetic coding to encode the input data stream. An output module provides an encoded data stream from the encoder to an output port. During the encoding process, the encoder performs a combination of parallel and serial processing steps on data in the input data stream. As a result, the processing cycle time for the encoding process is significantly reduced.

14 Claims, 3 Drawing Sheets

HIGH-SPEED DATA PROCESSOR AND CODING METHOD

BACKGROUND

In general, the present invention relates to a high-speed data processor and coding method. More specifically, the invention relates to a high-speed data processor and coding method useable in high resolution printing and scanning devices for computer systems.

Data compression is generally referred to as the technique of reducing the number of binary digits (or bits) required to represent image data. Image data can be compressed using a known data compression technique, such as arithmetic or Huffman encoding, and a standard data compression format, such as ITU Group 3/4, PACKBITS, LZW, JBIG, JPEG or ABIC.

Arithmetic coding is a well known and efficient process for entropy coding an input stream of image data. Arithmetic coding is used in many data compression applications including the ISO standards for JPEG and JBIG. One of the computations performed by an encoder implementing arithmetic coding to compress image data requires a series of processing steps which includes various calculations and decisions. The maximum speed of the overall encoding process depends on the ability of the encoder to perform these (and other) calculations and decisions quickly. In existing encoders, however, these processing steps are performed sequentially because each step depends upon the result of a previous step. This imposes a constraint on the minimum encoding cycle time.

SUMMARY OF THE INVENTION

In general, the invention features a high-speed data processor and compression method which replace the aforementioned sequential processing steps with a combination of serial steps and independent parallel steps, thereby eliminating a majority of the dependencies and allowing for a significant increase in processing speed. As such, the constraint on the minimum encoding cycle time is significantly reduced. It is noted that the invention can be implemented in JBIG and the arithmetic version of JPEG to increase processing speed for processors using such standards.

More specifically, the invention features a high-speed data processor including input and output formatters and an encoder. The input formatter receives a data stream from an input port or buffer. The encoder receives the data stream from the input formatter and encodes the data stream using arithmetic coding. The output formatter provides an encoded data stream from the encoder to an output port.

In accordance with the invention, the encoder performs a combination of parallel and serial processing steps during encoding of the data stream. First, the encoder receives as inputs first, second and third parameters (A, C and CX) having initial values. The first parameter represents the size of an interval between zero and one, and the second parameter represents the base of the interval (or bottom). The third parameter is the coding context used to define symbol probability estimates. The encoder then determines a value for a reference parameter (LSZ) as a function of the third parameter using an adaptive lookup table. Next, the encoder compares the fraction of the initial value for the first parameter with the value for a reference parameter and, in parallel, computes first and second updated values for each of the first and second parameters. If the fraction of the initial value for the first parameter is less than the value for a reference parameter, the encoder selects for output the first updated values for the first and second parameters. If, however, the fraction of the initial value for the first parameter is not less than the value for a reference parameter, the encoder selects for output the second updated values for the first and second parameters.

The invention also features a method for encoding a data stream using high-speed data processor. The method includes the steps of receiving an input data stream from an input port, encoding the input data stream in an encoder using arithmetic coding, and providing an encoded data stream from the encoder to an output port. During encoding of the input data stream, the encoder performs a combination of parallel and serial processing steps as described above.

Although the invention is generally described in the context of an encoder, it is noted that the invention may be implemented in a decoder. Thus, any implementation of the invention described herein in terms of encoders or encoding processes is applicable to decoders and decoding processes.

BRIEF DESCRIPTION OF THE DRAWINGS

These and other features of the invention are more fully described below in the detailed description and accompanying drawings of which the figures illustrate a method and apparatus for high speed arithmetic coding.

DETAILED DESCRIPTION OF THE INVENTION

Figure 1:
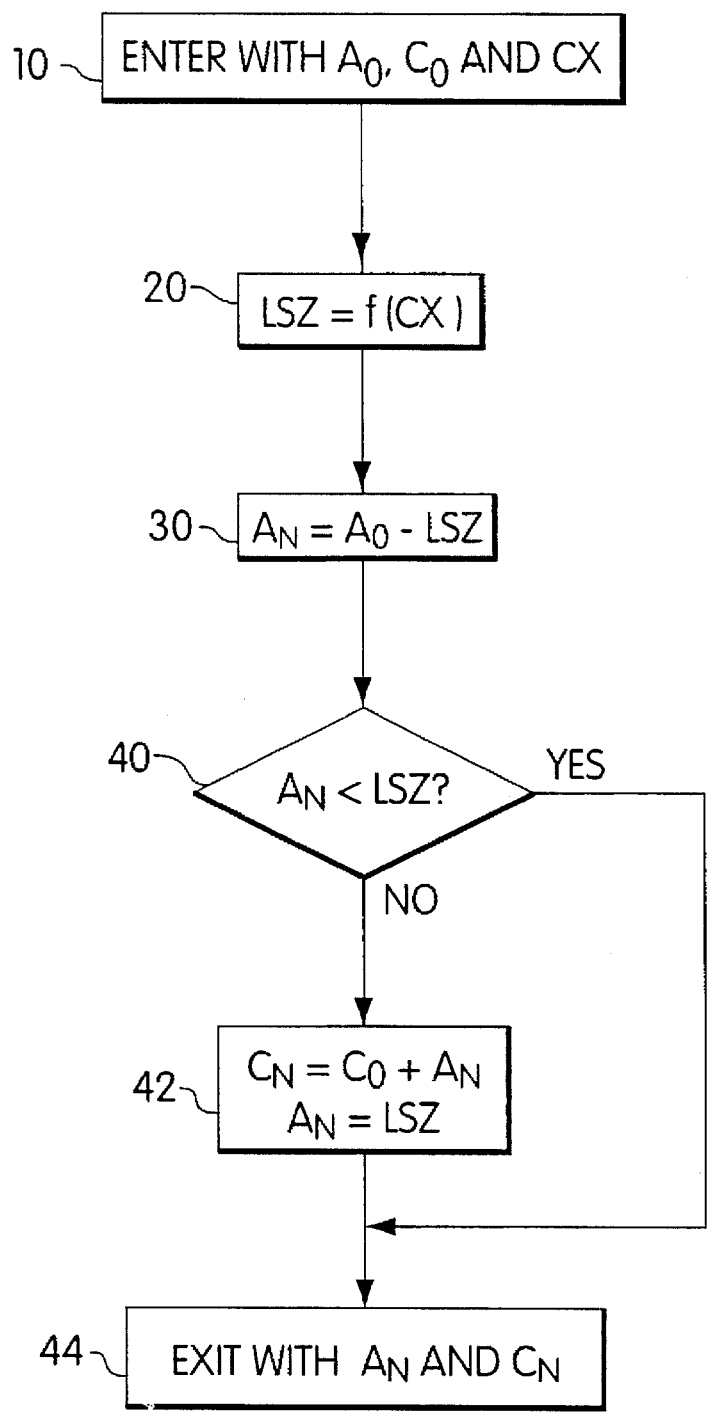
FIG. 1 is a flow chart illustration of a prior art data compression process.

FIG. 1 is flowchart illustrating a prior art data compression process which implements arithmetic coding (see, Document T.82 of the Telecommunication Standardization Sector of International Telecommunication Union (ITU-T)). During tan arithmetic coding process, an encoder (not shown) performs the sequential processing steps illustrated in FIG. 1 on an input stream of image data. Three input parameters A, C and CX having initial values $A_o$, $C_o$ and CX enter an encoder (not shown) at step 10. The parameter A represents the size of an interval between zero and one, and the second parameter represents the base of the interval (or bottom). The third parameter is the coding context used to define symbol probability estimates.

At step 20, a reference parameter LSZ is assigned a value based on a function of CX using a table lookup. A subtraction is then performed using the reference parameter at step 30. Specifically, the parameter A is updated to a new value $A_N$ by subtracting the reference parameter LSZ from the initial value $A_o$. It is noted that the subtraction operation depends upon the value assigned to the reference parameter LSZ. Next, a comparison of the new value $A_N$ and LSZ is made at step 40. Again, the comparison operation depends upon the new value $A_N$ of the parameter A. If $A_N$ is less than LSZ, the parameter C is updated to a new value $C_N$ by combining the initial value $C_o$ with $A_N$, and the parameter A is assigned the value of LSZ (step 42). The encoder outputs the values $A_N$ and $C_N$ for the parameters A and C at step 44. If, however, $A_N$ is not less than LSZ, the encoder outputs the value $A_N$ for the parameter A and the value $C_o$ for the parameter C. Once again, the downstream calculations depend upon the branch select result.

Due the dependencies in the prior art process, the four steps (i.e., the table lookup at step 20, the subtraction at step 30, the comparison at step 40, and the add operation at step 42) are necessarily performed sequentially. As such, it is difficult to improve the processing speed (or cycle time) in software or hardware implementations of this process.

In accordance with the invention, the prior art encoding process has been rearranged and rewritten to remove a majority of the dependencies inherent in the process. A data processor incorporating the principles of the invention performs combination of serial steps and independent parallel steps, so as to minimize dependencies and provide a significant increase in processing speed. Generally, the changes include rewriting the comparison operation to remove the dependency on the earlier subtraction operation, precalculating a new parameter TEMP, using a select operation instead of the branch select, and precalculating updated values for the parameters A and C. As a result of these changes, the time delay is reduced.

Figure 2:
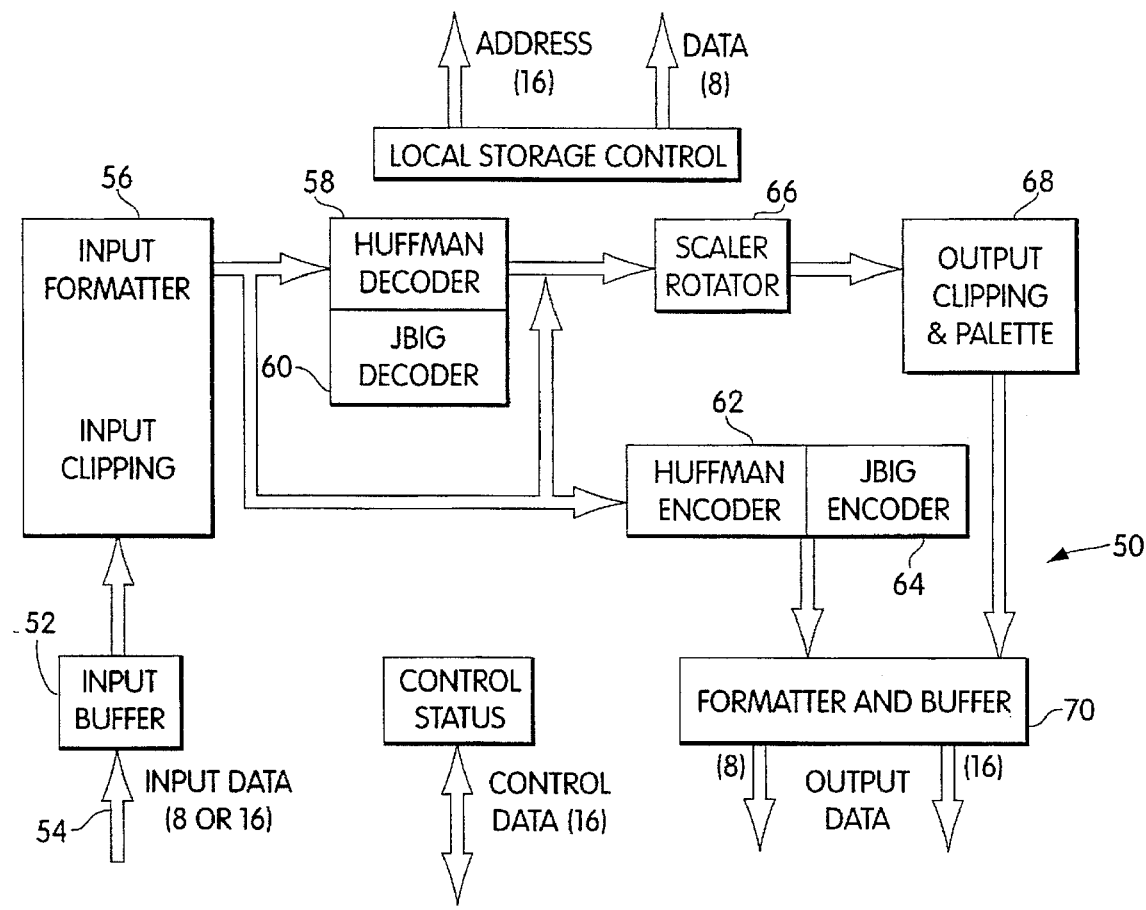
FIG. 2 is a block diagram of a high-speed data processor incorporating the principles of the invention.

FIG. 2 is a block diagram of a data processor 50 incorporating the principles of the invention. The processor includes an input buffer 52 connected to a data bus 54 for receiving an input stream of image data. A formatter/clipper 56 receives image data from the input buffer. The formatter implements bit and/or byte reversal on the data stream to provide image processor compatibility with various input data formats. The clipper performs X-Y clipping of the image to adjust the size of the input image data. The data stream can be output from the formatter/clipper directly to a data decoder (i.e., the Huffman decode 58 and/or the JBIG decoder 60). Alternatively, the data stream can be output directly an encoder (i.e., the Huffman encoder 62 and/or the JBIG encoder 64). The decoders perform image decompression to restore original image data for further image processing operations in the scaler/rotator module 66 and the output clipping/palette module 68. The encoders perform image compression to reduce original image data. The processed data is passed to an output formatter/buffer 70 for output.

Figure 3:
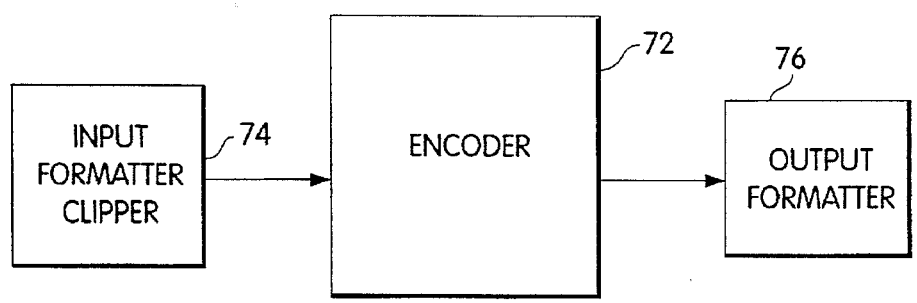
FIG. 3 is a block diagram of an encoder which operates in accordance with the invention.

FIG. 3 is a block diagram of an encoder which operates in accordance with the invention. The encoder 72 receives a data stream from the input formatter/clipper 74 and encodes the data stream using arithmetic coding. The output formatter 76 provides an encoded data stream from the encoder to an output port.

Figure 4:
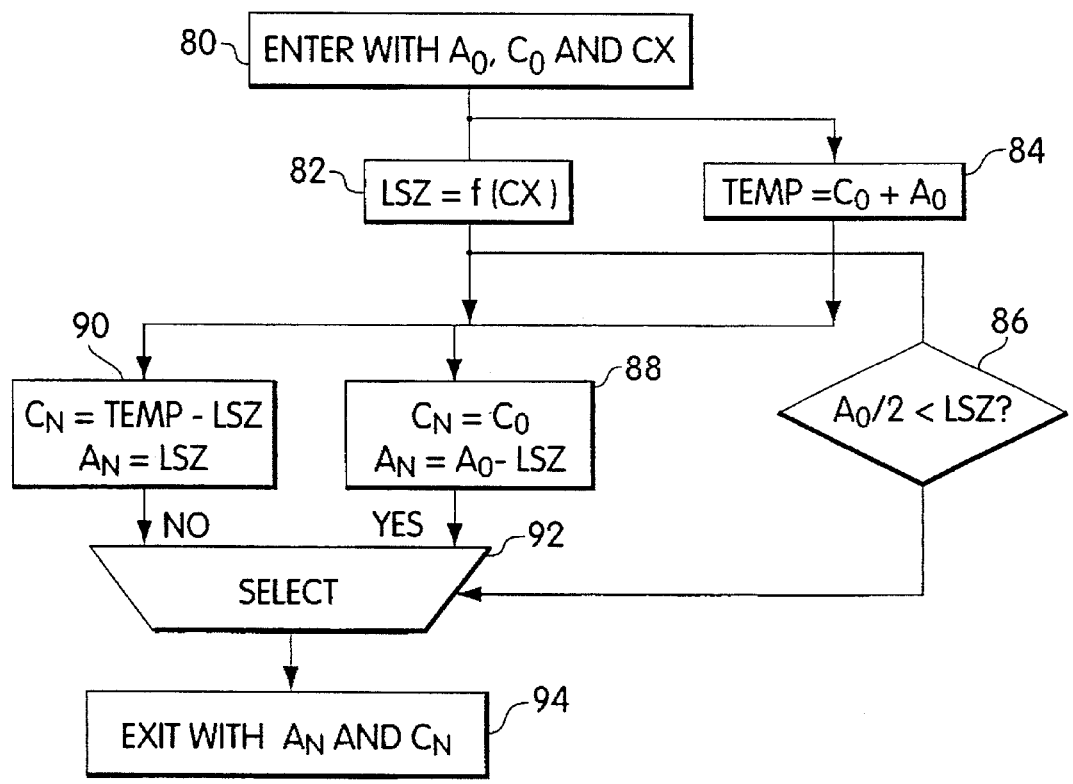
FIG. 4 is a flow chart illustration of a data compression process performed in a high-speed data processor in accordance with the invention.

FIG. 4 is a flow chart illustration of the data compression process performed in the encoder 72 in accordance with the invention. As shown, the encoder performs a combination of parallel and serial processing steps during encoding of the data stream. The input parameters A, C and CX having initial values $A_o$, $C_o$ and CX enter an encoder at step 80. The reference parameter LSZ is assigned a value based on a function of CX using a table lookup at step 82. The values $A_o$ and $C_o$ are added and the result is stored in a temporary location TEMP at step 84. It is noted that steps 82 and 84 are performed simultaneously and in parallel.

Next, a comparison of one-half of the value $A_o$ and LSZ is made at step 86, and, in parallel, first and second updated values for the parameters A and C are computed at steps 88 and 90. At step 88, the new value $C_N$ for the parameter C is set to $C_o$ and the parameter A is updated to a new value $A_N$ by subtracting the reference parameter LSZ from $A_o$. At step 90, the parameter C is updated to a new value $C_N$ by combing TEMP with LSZ, and the new value $A_N$ for the parameter A is assigned the value of LSZ.

If one-half of $A_o$ is less than LSZ, the new values for A and C computed at step 88 are selected by the encoder at step 92. If, however, one-half of $A_o$ is not less than LSZ, the new values for A and C computed at step 90 are selected by the encoder. The selected new values are output by the encoder at step 94. This combination of serial steps and independent parallel steps eliminates most of the dependencies and substantially reduces the processing cycle time delay.

Equivalents

While the invention has been particularly shown and described with reference to specific preferred embodiments, it should be understood by those skilled in the art that various changes in form and detail may be made therein without departing from the spirit and scope of the invention as defined by the appended claims.

I claim:

1. A high-speed data processor comprising:
   an input module for receiving an input data stream from an input port;
   an encoder coupled to the input module for encoding the input data stream;
   an output module for providing an encoded data stream from the encoder to an output port;
   wherein the encoder performs a combination of parallel and serial processing steps during encoding of the input data stream including
   (a) receiving as inputs first and second parameters having initial values and which are representative of properties of the input data stream,
   (b) determining a value for a reference parameter using a lookup table,
   (c) comparing the fraction of the initial value for the first parameter with the value for a reference parameter and, in parallel, computing first and second updated values for each of the first and second parameters,
   (d) if the fraction of the initial value for the parameter is less than the value for a reference parameter, selecting for output the first updated values for the first and second parameters,
   (e) if the fraction of the initial value for the parameter is not less than the value for a reference parameter, selecting for output the second updated values for the first and second parameters.

2. A high-speed data processor of claim 1 wherein combination of parallel and serial processing steps provides a reduced processing cycle time.

3. A high-speed data processor of claim 1 wherein the encoder performs arithmetic coding to encode the input data stream.

4. A high-speed data processor of claim 1 wherein the fraction of the initial value for the first parameter is one-half.

5. A high-speed data processor of claim 1 wherein the initial value for the first parameter represents the size of an interval.

6. A high-speed data processor of claim 5 wherein the initial value for the second parameter represents the base of the interval.

7. A high-speed data processor of claim 1 wherein the input module is an input formatter.

8. A high-speed data processor of claim 1 wherein the output module is an output formatter.

9. A high-speed data processor of claim 1 wherein the encoder further receives as an input a third parameter having a value which is representative of a coding property of the encoder, and wherein the value for a reference parameter is determined as a function of the third parameter using a lookup table.

10. A high-speed data processor comprising:

an input formatter for receiving an input data stream from an input port;

an encoder coupled to the input formatter for encoding the input data stream using arithmetic coding;

an output formatter for providing an encoded data stream from the encoder to an output port;

wherein the encoder performs a combination of parallel and serial processing steps during encoding of the data stream including (a) receiving as inputs first and second parameters having initial values and which are representative of properties of the data stream, and receiving as an input a third parameter having a value which is representative of a coding property of the encoder, (b) determining a value for a reference parameter as a function of the third parameter using a lookup table, (c) comparing one-half of the initial value for the first parameter with the value for a reference parameter and, in parallel, computing first and second updated values for each of the first and second parameters, (d) if one-half of the initial value for the first parameter is less than the value for a reference parameter, selecting for output the first updated values for the first and second parameters, (e) if one-half of the initial value for the first parameter is not less than the value for a reference parameter, selecting for output the second updated values for the first and second parameters.

11. A high-speed data processor of claim 10 wherein combination of parallel and serial processing steps provides a reduced processing cycle time.

12. A high-speed data processor of claim 10 wherein the initial value for the first parameter represents the size of an interval between zero and one.

13. A high-speed data processor of claim 12 wherein the initial value for the second parameter represents the base of the interval.

14. A method for encoding a data stream using high-speed data processor comprising:

receiving an input data stream from an input port;

encoding the input data stream in an encoder using arithmetic coding;

providing an encoded data stream from the encoder to an output port;

wherein said encoding of the input data stream includes a combination of parallel and serial processing steps including (a) receiving as inputs first and second parameters having initial values and which are representative of properties of the data stream, and receiving as an input a third parameter having a value which is representative of a coding property of the encoder, (b) determining a value for a reference parameter as a function of the third parameter using a lookup table, (c) comparing one-half of the initial value for the first parameter with the value for a reference parameter and, in parallel, computing first and second updated values for each of the first and second parameters, (d) if one-half of the initial value for the first parameter is less than the value for a reference parameter, selecting for output the first updated values for the first and second parameters, (e) if one-half of the initial value for the first parameter is not less than the value for a reference parameter, selecting for output the second updated values for the first and second parameters.

* * * * *